Patented Aug. 24, 1943

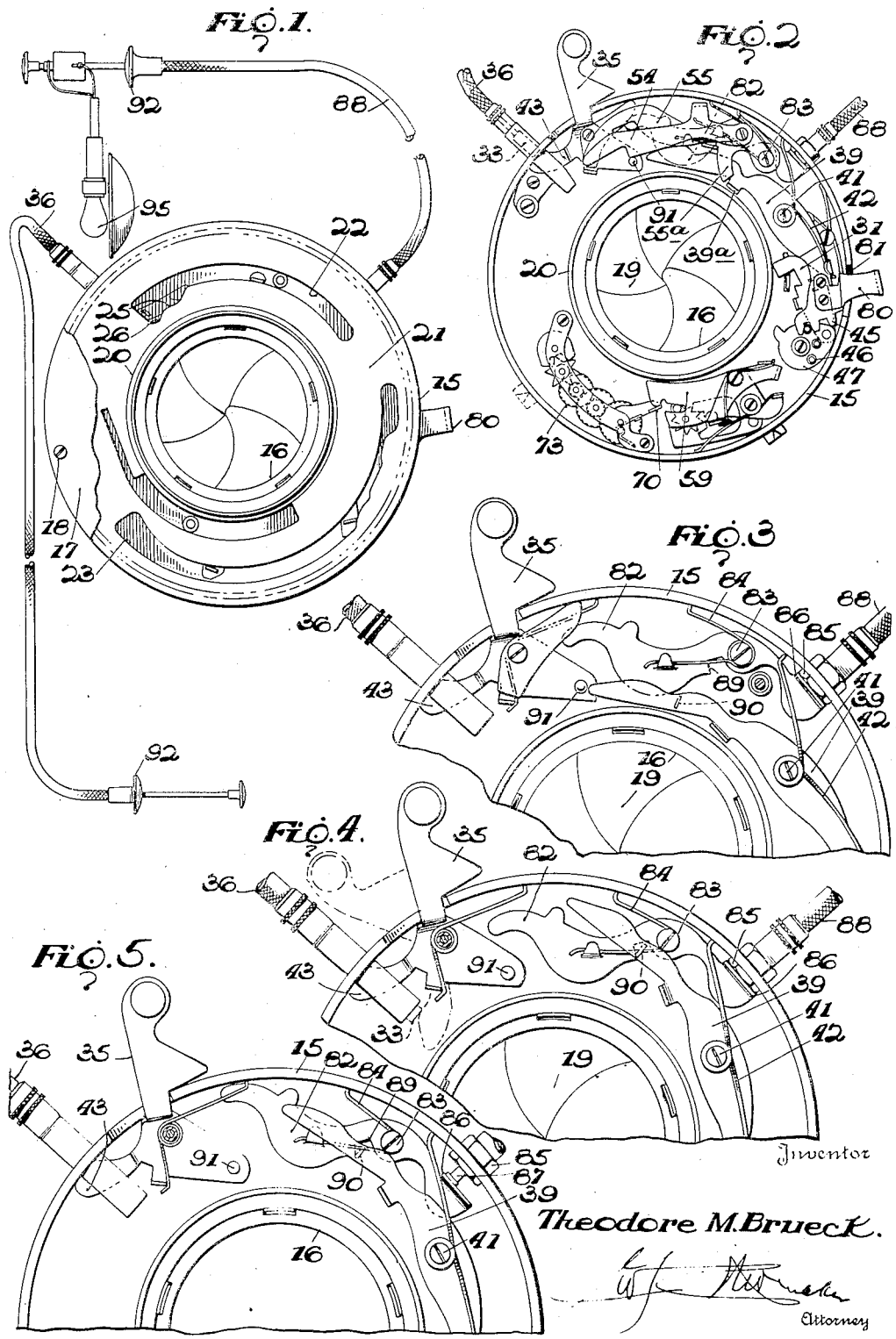

2,327,591

UNITED STATES PATENT OFFICE 2,327,591

PHOTOGRAPHIC SHUTTER OPERATING MECHANISM

Theodore M. Brueck, Rochester, N. Y., assignor to Ilex Optical Company, Rochester, N. Y., a corporation of New York Application July 2, 1941, Serial No. 400,843

4 Claims. (Cl. 95—63)

The present invention relates to photographic shutter-operating mechanism and more particularly to shutter-operating mechanism of the type shown and described in my United States Patent No. 2,129,561, dated September 6, 1938, and over which mechanism the present invention is designed as an improvement.

The improved shutter-operating mechanism comprising the present invention is particularly well adapted for use in connection with contact devices for automatically synchronizing the camera shutter operations and the photoflash or other flash lamp utilized as a source of light for taking the picture. Such adaptation of the shutter-operating mechanism is readily made whether the contact devices be of the built in type wherein they are contained within the casing which encloses the shutter-operating instrumentalities or whether they are externally mounted. The invention, however, is not to be limited to use of the improved shutter-operating mechanism for synchronizing purposes as the mechanism is useful independently thereof and when so used provides an extremely efficient shutter control by means of which delayed or substantially instantaneous shutter action is made possible.

The principal object of the present invention is to provide a shutter-operating mechanism of the type shown in my above identified patent which employs an auxiliary locking lever for locking the shutter-actuating master lever in a potential operating position preparatory to release thereof for shutter operation, together with an auxiliary cable release mechanism which is possessed of an extremely short stroke and which is employed independently of the conventional release member for effecting of the master operating lever by the locking lever. By such an arrangement of parts, a far more efficient manual shutter control is obtained when the camera is employed in the ordinary manner of taking daylight pictures and also, when the camera is utilized for the taking of photoflash or similar pictures wherein the light impulse is synchronized with the shutter movements, the short stroke required by the cable release mechanism makes it possible to secure more accurate timing of the shutter movements with the light impulse.

Another object of the invention, in an apparatus of the type set forth in my above referred to patent, is to divorce the movement of the master lever in proceeding to its locked position preparatory to the taking of a picture from any association with the release member and toward this end the master lever, according to the present invention, is provided with an extension which projects exteriorly of the casing which encloses the shutter-operating instrumentalities and which may be depressed manually to move the master lever to its locked position independently of the release member. By such an arrangement of parts any tendency on the part of the operator, when actuating the release member to bring the master lever to its "set" position, to move the release member completely through the "set" position and set off the shutter mechanism is prevented.

The improved shutter-control apparatus is entirely independent of the requirements of time and bulb action for the shutter and the invention does not deal with such actions. Rather it deals solely with an automatic shutter action which, although it is controllable to low speeds is capable of extremely high speeds and which is readily adaptable to various forms of synchronizing apparatus for efficient operation regardless of the speed of shutter operation selected.

In addition to the above outlined specific objects the invention, being designed as an improvement over the existing apparatus shown in my above mentioned patent, has for its general objects the same general objects set forth in the specification of the said patent and principal among which is the production of an efficient automatic shutter action which is obtained by the unchecked movement of an actuator continuously through a more or less linear path in one direction to effect both the opening and the closing movements of the shutter.

With these and other objects in view, which will become more readily apparent as the nature of the invention is better understood, the invention consists in the novel construction, combination and arrangement of parts shown in the accompanying drawing in which:

Figure 1 is a front elevational view of a composite camera shutter mechanism constructed in accordance with the principles of the present invention.

Figure 2 is a front elevational view similar to Figure 1 with the cam and cover plates removed to more clearly reveal the nature of the invention.

Figure 3 is an enlarged fragmentary front elevational view of the assembled shutter-operating instrumentalities showing the master lever in its normal position of rest.

Figure 4 is a fragmentary view similar to Figure 3 showing the master lever in its locked position preparatory to the taking of a picture, and Figure 5 is a similar view showing the master lever released and the shutter open during the actual taking of the picture.

In all of the above described views, like characters of reference are employed to designate like parts throughout.

Referring now to the drawing in detail, the shutter-operating instrumentalities are encased in a shallow ring-like casing 15 having a central opening 16 designed for registry with the lens tube of a camera (not shown) and which is adapted to be opened and closed by means of a Compur type shutter mechanism 19. The casing 15 may be attached to the camera in any suitable manner as for example as shown in my above mentioned Patent No. 2,129,561. The front of the casing is enclosed by a ring-shaped cover plate 17 which is anchored in position by means of screws 18 or the like. An upstanding circular flange 20 is formed on the cover plate 17 and surrounds the central opening 16 and slidably receives thereon a flat slotted rotatable cam ring 21 which bears against the plate 17. The ring 21 is provided with substantially diametrically opposed elongated concentric slots 22 and 23 and, since the former slot 22 is provided for use in connection with the bulb and time control of the shutter mechanism 19 and since these control features are not otherwise concerned with the present invention, it need not be further described than to point out that it has a stepped cut-away portion at one end having steps 25 and 26 the former being effective when bulb exposures are to be made and the latter being effective when time exposures are to be made. Likewise, the latter slot 23 is foreign to the present invention and is provided for the purpose of controlling the retardation of the shutter mechanism 19 as well as for other purposes.

The shutter control instrumentalities of the present invention are similar in many respects to the control devices shown and described in my prior patent above referred to and reference may be had to the said patent for a full disclosure of the time and bulb control features as well as for a disclosure of the means whereby the shutter movements are retarded to an extremely accurate controlled degree. The present invention in general is concerned with the provision of an extremely simple locking and short stroke cable release mechanism which may be applied to the shutter control system of my prior patent with but slight modification of certain of the structure disclosed therein.

For convenience in Fig. 2, the entire control mechanism of my prior patent as modified by the present invention has been illustrated. Briefly, the mechanism includes a master lever 39 which is rockable about a pivot 41 and which is urged toward a normal position as shown in Fig. 3 by means of a spring 42. A series of teeth 45 formed on one end of the lever 39 cooperate with pins 46 on an oscillatable actuator 47 which, by means of a continuous, unchecked, return stroke in one direction serves to, in cooperation with an upturned shutter actuating arm 31, effect the instantaneous or retarded movements of the shutter mechanism 19. The actuator 47 cooperates with a retarding lever 59, which, together with various associated instrumentalities, in turn cooperates with a contact piece 70 included in an escapement mechanism 73 by means of which a retarding influence is applied through the various levers and other illustrated parts directly to the shutter mechanism 19.

A pair of levers 54 and 55 cooperate with the master member 39 and finger release member 35 in bulb and time actuation of the shutter mechanism 19. The levers 54 and 55 are foreign to the present invention and have been eliminated from the showing of Figs. 3, 4 and 5 in order that the essential features of the present invention may be more clearly recognized.

The master lever 39 is adapted to be moved to set in a poised or locked position as shown in Figure 4 and from this position to be released to permit unidirectional movement of the actuator 47 to open and close the shutter mechanism 19. In my prior patent movement of the master lever 39 to its poised position is accomplished directly by a finger piece similar to the finger piece 35 of the present invention and which also serves to release the master lever for shutter operation. The finger piece 35 may be manually operated if desired but preferably its operation is controlled by means of a cable control mechanism 36 of conventional design having a plunger 33 which cooperates with an extension 43 formed on the finger piece 35.

In the present instance, the setting operation of the master lever is entirely divorced from any association with the finger piece 35 and instead a manually depressible finger piece 80 is riveted or otherwise secured to or formed on one end of the master lever 39 and projects through a slot 81 in the casing 15. Upon depression of the finger piece 80 the lower end of the master lever 39 is moved inwardly of the casing while the upper end thereof is moved outwardly and the lever assumes the poised or locked position shown in Figure 4. In order to maintain the lever 39 in its poised position, a locking and release lever 82 is pivoted as at 83 medially of its ends within the casing 15 and is normally urged by means of a spring 84 to a normal position wherein one end thereof bears against a threaded hollow nipple 85 which is secured in and extends through the outer wall of the casing 15. An upturned flange or lug 86 formed on the lever 82 normally overlies the central opening of the nipple 85 and is adapted to cooperate with the plunger 87 of a conventional cable release mechanism 88 in a manner and for a purpose to be described presently. The locking and release lever 82 is formed with a shoulder 89 medially thereof and in that side of the lever which is above the pivot point 83. The shoulder 89 is designed for latching cooperation with a depending lug 90 formed on the master lever 39 in holding this latter lever in its poised position. Thus, when the finger piece 80 is depressed and the lever is moved toward its poised position as shown in Figure 4 and as the lever 39 approaches the limit of its movement the depending lug 90 engages the side of the locking lever 82, and by a camming action, moves this latter lever to one side while the lug 90 slides into position on the shoulder 89.

Whereas in my prior patent the finger piece which corresponds to the fingerpiece 35 of the present invention is provided with an upstanding lug which cooperates with the master lever 39 in moving the latter to its poised position, this lug has been omitted in the present instance and the end of the fingerpiece 35 is free to move past the end of the master lever without engagement between these parts. A depending lug 91 is provided on the finger piece 35 and this latter lug is designed for engagement with the upper end of the locking lever 82 for the purpose of shifting the position of the lever to release the master lever 39. The function of the finger piece 35 and its associated lug 91 is limited in the present instance to use when time and bulb operations of the shutter mechanism are to be utilized. In such instances the relatively long stroke through which the finger piece 35 must be moved is of no particular consequence but where the camera shutter mechanism is to be synchronized with the operations of a photoflash device a shorter stroke of the operating member is highly desirable to effect accurate timing.

According to the present invention therefore the cable release mechanism 88 is designed to cooperate with the lug 86 formed on the end of the locking and release lever 82 and toward this end the extreme end of the plunger 87 is normally in register with the lug 86 in close proximity thereto and is adapted upon depression of the plunger of the cable knob 92 to engage the lug and move the locking and release lever to a position wherein the shoulder 89 is out of engagement with the lug 90 on the master lever 39, as shown in Figure 5. The extent of movement of the cable plunger 87 required to effect such release is slight and as a consequence accurate register of any contact elements which may be associated with the cable release mechanism or which may be built into the camera casing 15 for photoflash purposes is made possible in order that a greater degree of accuracy in timing may be obtained.

While the particular form of synchronizing device employed is immaterial insofar as the present invention is concerned, I have selected for illustrative purposes a more or less conventional type of synchronizing device wherein one end of a binding post is adapted to engage the end of the cable release knob and complete a circuit through a battery to establish an electrical circuit through the flash bulb 95 in the usual manner when the plunger, which passes through the knob is fully depressed.

Referring again to Figures 1 and 2, it will be seen that the improved control system for the shutter-operating mechanism shown in my prior patent is operable independently of the finger piece 35 to move the locking and release lever 82 to release the master 39 from its poised position regardless of the angular position of the cam ring 21. The cam ring 21, by virtue of the cam slot 23 and its associated mechanism is operable in the usual manner to control the movements of the shutter mechanism 19 from a substantially instantaneous exposure to an exposure which is considerably delayed or retarded and such time control of the shutter mechanism is effective regardless of whether the finger piece 35 or the cable release mechanism 88 is utilized to move the locking and release lever 82 out of holding engagement with the master lever 39. The slot 22, however, is effective in controlling the time and bulb operations of the shutter mechanism only when the finger piece 35 is actuated to release the master lever 39. The reason for this is apparent from the disclosure of Figure 2 wherein the lever 55 is provided with an arcuate extension 55a which cooperates with a lug 35a on the master lever during utilization of the apparatus for time and bulb operations. When the master lever 39 is in its poised position preparatory to release by the cable release mechanism 88 the lever 55 is in its normal position wherein the curved extension 55a is out of the path of movement of the lug 39a and consequently, when the locking and release lever 82 is moved to its releasing position (other parts remaining stationary) unobstructed movement of the master lever 39 through its full stroke or extent of movement is possible and the actuator 47 is free to move continuously through its return stroke in one direction to effect opening and closing of the shutter mechanism 19 according to the particular time setting of the cam ring 21.

The invention is not to be limited to the exact arrangement of parts shown in the accompanying drawing or described in this specification as various changes in the details of construction may be resorted to without departing from the spirit of the invention. For example, while I have shown for illustrative purposes one form of external synchronizing device in association with the improved short-stroke control mechanism, it is obvious that other types of synchronizing apparatus with either external or internal connections may be resorted to. Only insofar as the invention is particularly pointed out in the accompanying claims is the same to be limited.

What is claimed is:

1. The combination with a photographic shutter of a casing surrounding the shutter, shutter operating control instrumentalities disposed within the casing, said control instrumentalities including a master control lever movable in one direction from a poised position to a terminal position, a spring for moving said lever in said direction, a connection between the master control lever and the shutter for effecting the opening and the closing movements of the latter, a locking and release lever pivoted intermediate its ends for swinging movement about its pivotal axis and having a shoulder thereon on one side of said pivotal axis designed for latching engagement with the master control lever for holding the latter in its poised position, a movable finger piece having an abutment thereon for engagement with the locking and release lever adjacent one end thereof for moving the shoulder out of engagement with the master control lever to release the latter, there being an opening in the wall of said casing, a flange on said locking and release lever adjacent the other end thereof normally bearing against the casing and overlying and closing the opening, and a plunger slidably disposed in said opening and having one end thereof engageable with the flange for moving the locking and release lever from latching engagement with the master control lever.

2. The combination with a photographic shutter of a ring-like casing surrounding the shutter and having an outer cylindrical wall, an inner cylindrical wall and a ring-like rear wall extending from the inner to the outer wall, a master control lever pivoted to the rear wall at a point medially of its ends and movable in one direction from a poised position to a terminal position, a spring for moving said lever in said direction, a connection between the lever and the shutter for effecting the opening and the closing movements of the latter, a finger piece secured to the lever and projecting through the outer cylindrical wall of the casing for moving the lever to its poised position, a locking and release lever pivoted intermediate of its ends to the rear wall, a shoulder on said locking and release lever medially thereof designed for latching engagement with the master control lever for holding the same in its poised position, a spring normally urging the locking and release lever to a position wherein said first mentioned end of the locking and release lever is in close proximity to the outer cylindrical wall of the casing, and a cable release mechanism including a plunger projecting through the outer cylindrical wall and having its end abutting against said first mentioned end of the locking and release lever and movable inwardly of the casing to shift the position of the latter lever and effect release of the master control lever from its poised position.

3. The combination with a photographic shutter of a ring-like casing surrounding the shutter and having an outer cylindrical wall, an inner cylindrical wall and a ring-like rear wall extending from the inner to the outer wall, a master control lever pivoted to the rear wall at a point medially of its ends and movable in one direction from a poised position to a terminal position, a spring for moving said lever in said direction, a connection between the lever and the shutter for effecting the opening and the closing movements of the latter, a finger piece secured to the lever and projecting through the outer cylindrical wall of the casing for moving the lever to its poised position, a locking and release lever pivoted to the rear wall at a point intermediate of its ends, a shoulder on said locking and release lever medially thereof designed for latching engagement with the master control lever for holding the latter in its poised position, a spring normally urging the locking and release lever to a position wherein one end of the same is in close proximity to the outer cylindrical wall of the casing, a cable release mechanism including a plunger projecting through the outer cylindrical wall and having its end abutting against said first mentioned end of the locking and release lever and movable inwardly of the casing to shift the position of the latter lever and effect release of the master control lever from its poised position, and a finger piece pivoted to the rear wall and projecting outwardly through the outer cylindrical wall, said latter finger piece being normally out of engagement with the locking and release lever and having a portion thereof movable into engagement with the latter for shifting the position thereof to release the master lever from its poised position.

4. The combination with a photographic shutter, of a casing surrounding the shutter, shutter operating control instrumentalities disposed within the casing, said control instrumentalities including a master control lever movable in one direction from a poised position to a terminal position, a spring for moving said lever in said direction, a connection between the master control lever and the shutter for effecting the opening and closing movements of the shutter, a locking and release lever pivoted intermediate of its ends for swinging movement about its pivoted axis and having a shoulder arranged for latching engagement with the master control lever for holding said master control lever in its poised position, a movable finger piece having an abutment for engagement with the locking and release lever adjacent one end thereof for moving said shoulder out of engagement with the master control lever to release the same, there being an opening in the wall of said casing, a flange on said locking and release lever adjacent the other end thereof and on the side of said pivotal axis which is opposite the end engaged by said finger piece, said flange normally bearing against the casing and overlying and closing said opening, a plunger disposed in said opening and having one end engageable with the flange for moving the locking and release lever from latching engagement with the master control lever, and a finger piece on the master control lever projecting through the casing for moving the master control lever to its poised position.

THEODORE M. BRUECK.